United States Patent
Zhu et al.

(10) Patent No.: US 7,789,990 B2
(45) Date of Patent: Sep. 7, 2010

(54) SILANE FUNCTIONAL ADHESIVE COMPOSITION AND METHOD OF BONDING A WINDOW TO A SUBSTRATE WITHOUT A PRIMER

(75) Inventors: Huide D. Zhu, Rochester, MI (US); Daniel P. Heberer, Rochester Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 613 days.

(21) Appl. No.: 11/825,085

(22) Filed: Jul. 3, 2007

(65) Prior Publication Data

US 2008/0017296 A1 Jan. 24, 2008

(51) Int. Cl.
*B60J 1/00* (2006.01)
*E06B 3/00* (2006.01)
*E06B 5/00* (2006.01)
*E06B 7/00* (2006.01)
*C04B 37/00* (2006.01)
*B41J 2/16* (2006.01)
*B32B 7/12* (2006.01)
*C09J 4/00* (2006.01)
*C09J 101/00* (2006.01)
*C09J 201/00* (2006.01)
*C09J 7/02* (2006.01)
*C08L 83/00* (2006.01)
*C08L 83/04* (2006.01)

(52) U.S. Cl. .................. 156/325; 156/108; 156/326; 156/327; 156/328; 156/329; 524/588

(58) Field of Classification Search .............. 156/108, 156/325–329; 524/588
See application file for complete search history.

(56) References Cited

U.S. PATENT DOCUMENTS

| | | | |
|---|---|---|---|
| 3,707,521 A | 12/1972 | De Santis | |
| 3,779,794 A | 12/1973 | De Santis | |
| 3,971,751 A | 7/1976 | Isayama et al. | |
| 3,979,344 A | 9/1976 | Bryant et al. | |
| 4,374,237 A | 2/1983 | Berger et al. | |
| 4,525,511 A | 6/1985 | Kirby et al. | |
| 4,687,533 A | 8/1987 | Rizk et al. | |
| 4,788,254 A | 11/1988 | Kawakubo et al. | |
| 4,889,903 A | 12/1989 | Baghdachi | |
| 4,906,707 A | 3/1990 | Yukimoto et al. | |
| 4,923,927 A | 5/1990 | Hirose et al. | |
| 4,977,228 A | 12/1990 | Wakabayashi et al. | |
| 5,011,900 A | 4/1991 | Yukimoto et al. | |
| 5,063,270 A | 11/1991 | Yukimoto et al. | |
| 5,223,597 A | 6/1993 | Iwakiri et al. | |
| 5,342,914 A | 8/1994 | Iwakiri et al. | |
| 5,409,995 A | 4/1995 | Iwahara et al. | |
| 5,567,833 A | 10/1996 | Iwahara et al. | |
| 5,650,467 A | 7/1997 | Suzuki et al. | |
| 5,952,052 A | 9/1999 | Hattori et al. | |
| 6,355,127 B1 * | 3/2002 | Mahdi et al. ................ | 156/155 |
| 6,512,033 B1 | 1/2003 | Wu | |
| 6,649,016 B2 | 11/2003 | Wu | |
| 6,828,403 B2 | 12/2004 | Mahdi et al. | |
| 2002/0100550 A1 | 8/2002 | Mahdi et al. | |
| 2003/0173026 A1 | 9/2003 | Wu et al. | |
| 2005/0126683 A1 * | 6/2005 | Hsieh et al. ................ | 156/108 |
| 2006/0270807 A1 | 11/2006 | Zhu et al. | |
| 2007/0093628 A1 | 4/2007 | Zhu et al. | |

FOREIGN PATENT DOCUMENTS

WO   WO 03/076546   9/2003

* cited by examiner

*Primary Examiner*—Philip C Tucker
*Assistant Examiner*—Michael N Orlando
(74) *Attorney, Agent, or Firm*—Dobrusin & Thennisch PC

(57) ABSTRACT

The invention is an adhesive composition comprising one or more polymers having a flexible backbone and silane moieties capable of silanol condensation; one or more hydrophobic silanes having one or more hydrocarbyloxy groups and one or more hydrocarbyl groups; one or more catalysts for the reaction of silane moieties with active hydrogen containing compounds. Preferably, the adhesive composition further comprises one or more heat stabilizers and/or light stabilizers. In another embodiment, the invention is a method of bonding a window to a coated substrate, such as a window in a vehicle, which comprises applying to the window or the coated substrate an adhesive as described; contacting the window with the coated substrate wherein the adhesive is located between the window and the substrate; and allowing the adhesive to cure.

22 Claims, No Drawings

SILANE FUNCTIONAL ADHESIVE COMPOSITION AND METHOD OF BONDING A WINDOW TO A SUBSTRATE WITHOUT A PRIMER

BACKGROUND OF THE INVENTION

This invention relates to a silane functional adhesive composition and to a method of bonding a window to a coated substrate using the adhesive. In a preferred embodiment the adhesive can bond a window into a structure without the need for a primer for the coated substrate and/or the window.

Polyurethane sealant (adhesive) compositions are used for bonding non-porous substrates, such as glass, to nonporous substrates; these are described in U.S. Pat. No. 4,374,237 and U.S. Pat. No. 4,687,533, both incorporated herein by reference. U.S. Pat. No. 4,374,237 describes a polyurethane sealant containing urethane prepolymers which have been further reacted with secondary amine compounds containing two silane groups. U.S. Pat. No. 4,687,533 describes a polyurethane sealant containing urethane prepolymers which contain silane groups which have been prepared by reacting a polyisocyanate having at least three isocyanate groups with less than an equivalent amount of an alkoxysilane having a terminal group containing active hydrogen atoms reactive with isocyanate groups to form an isocyanatosilane having at least two unreacted isocyanate groups. In a second step, the isocyanatosilane is mixed with additional polyisocyanate and the mixture is reacted with a polyol to form a polyurethane prepolymer having terminal isocyanato groups and pendant alkoxysilane groups. EP 856,569 discloses the use of polyoxyalkylene polymer terminated with silanes having hydrolyzable groups bonded thereto blended with a polyoxyalkylene polymer having no cross-linking groups to bond glass to metal, incorporated herein by reference.

When such adhesives are used to bond glass substrates to coated substrates, such as for window installation in vehicle manufacturing, the lap shear strength of the bonded substrate may be less than desirable for safety or structural purposes. Consequently, a separate paint primer comprising a solution of one or more silanes is typically applied to a coated substrate prior to the application of the adhesive in most vehicle assembly operations for bonding the windshield and the rear window to the vehicle. The use of a primer in assembly operations is undesirable in that it introduces an extra step, additional cost, the risk of marring the coated surface if dripped on an undesired location and exposes the assembly line operators to additional chemicals.

U.S. Pat. No. 6,828,403 (incorporated herein by reference) discloses an adhesive composition which comprises a siloxy functional polymer, a dialkyltin carboxylate or alcoholate catalyst and a secondary amino straight chain alkyl trialkoxy silane adhesion promoter. The adhesive bonds to coated substrates without the need for a primer but does not bond to windows without the need for a primer. U.S. Pat. No. 6,649,016 (incorporated herein by reference) discloses an adhesive composition comprising A) one or more polymers having a flexible backbone and silane moieties capable of silanol condensation; B) one or more titanates or zirconates having one or more ligands comprising hydrocarbyl phosphate esters and/or a hydrocarbyl sulfonate esters; and C) an anhydrous strong organic acid which is miscible with the polymer and enhances the bonding of the adhesive to a coated substrate in the absence of a primer having improved long term durability over the adhesives disclosed in U.S. Pat. No. 6,828,403.

Automotive OEMs have demanded that the paint suppliers provide more robust acid resistant paint systems which stand up to harsh environmental conditions. These paint systems are difficult to bond to due to the increased chemical resistance of the paints. One problem with developing an adhesive which bonds to these paint systems on an automobile is that there are several different paint chemistries. The automobile producers also demand an adhesive for bonding glass into a vehicle which cures rapidly so that the vehicle can be moved without the glass falling out or slipping from the desired location. Additionally, it is important that the adhesive demonstrates stability prior to application, and that is does not cure before being applied to bond the window into the vehicle. If the adhesive cures in the delivery system in the auto plant, the assembly time must be shut down while the adhesive delivery system is purged. Such a shut down is very costly for the automotive companies and must be avoided. In addition to the above needs, such adhesives need to demonstrate rapid cure upon exposure to ambient conditions. The adhesive needs to bond, or link up, to the unprimed coated surface as soon as possible so the risk of the window moving from where it is placed is reduced. Automobiles last upwards of 10 years and the adhesive needs to maintain its integrity and hold the window into the vehicle for the life of the vehicle under a variety of difficult conditions. Thus, what is needed is an adhesive which can be applied to the automotive paints, especially difficult to bond to paints, and to bond glass into a vehicle without the need to use a primer for the coated surface, the window surface or both. Desirably the adhesive demonstrates strong adhesion, adhesive strength, rapid cure, fast link-up, good stability and long term durability.

SUMMARY OF THE INVENTION

The invention is an adhesive composition comprising one or more polymers having a flexible backbone and silane moieties capable of silanol condensation; one or more hydrophobic silanes having one or more hydrocarbyloxy groups; and one or more hydrocarbyl groups; and one or more catalysts for the reaction of silane moieties with active hydrogen containing compounds. Preferably, the adhesive composition further comprises one or more heat stabilizers and/or light stabilizers. Preferably, the groups bound on the silicon atoms comprise one or more of alkyl, alkenyl, cycloalkyl or alkaryl groups and one or more alkyloxy, alkenyloxy, cycloalkyloxy or alkaryloxy groups. More preferably, each silicon atom has bonded thereto at least one alkenyl with the remainder of the groups bonded thereto being alkyl or alkoxy.

In one embodiment, the invention is a method of bonding a window to a coated substrate, such as a window in a vehicle. The process comprises applying to the window or the coated substrate an adhesive as described herein; contacting the window with the coated substrate wherein the adhesive is located between the window and the substrate; and allowing the adhesive to cure. Preferably, one or both of the coated substrate and window are unprimed, more preferably both.

The adhesive and method of the invention allow the bonding of a window to a coated substrate without the need for priming the surface of the substrate, the window or both. This is especially useful for bonding windows into automobiles. The adhesive further demonstrates excellent adhesive and cohesive strength, excellent stability before application, rapid cure rate, rapid link up and long term durability.

DETAILED DESCRIPTION OF THE INVENTION

The adhesive composition of the invention contains a polymer having a flexible backbone and having silane moieties capable of silanol condensation. The polymer with a flexible backbone can be any polymer with a flexible backbone which can be functionalized with a silane capable of silanol condensation. Among preferred polymer backbones are polyethers, polyurethanes, polyolefins, polyesters and the like. Among more preferred polymer backbones are the polyethers and polyurethanes, with the most preferred being the polyethers. Even more preferably, the polymer is a polyether having silane moieties capable of silanol condensation. In one embodiment, the polymer useful in the invention is a polymer as disclosed in Yukimoto et al., U.S. Pat. No. 4,906,707; Iwakiri et al., U.S. Pat. No. 5,342,914; Yukimoto U.S. Pat. No. 5,063,270; Yukimoto et al., U.S. Pat. No. 5,011,900; or Suzuki et al., U.S. Pat. No. 5,650,467, all incorporated herein by reference. More preferably such polymers are oxyalkylene polymers containing at least one reactive silicon group per molecule. The oxyalkylene polymer which can be used in the present invention includes polymers having a molecular chain represented by Formula (1):

$$-(R-O)_n- \quad (1)$$

wherein R represents a divalent alkylene group having 2 to 4 carbon atoms, and preferably 2 to 3 carbon atoms; and n represents the number of repeating units. The oxyalkylene polymer may have a straight chain or a branched structure, or a mixed structure thereof. From the viewpoint of availability an oxyalkylene polymer having a repeating unit represented by Formula (2) is preferred:

$$-CH(CH_3)CH_2O- \quad (2)$$

The polymer may contain other monomer units but preferably comprises the monomer unit of Formula (1) in a proportion of at least about 50 percent by weight, more preferably about 80 percent by weight or more and most preferably 100 percent. Oxyalkylene polymers having a number average molecular weight (Mn) of about 1,000 or more are preferred. Those having a Mn of about 2,000 to about 50,000 are even more preferred, and with about 2,000 to about 30,000, most preferred.

The terminology "reactive silicon group" or "reactive silane capable of silanol condensation" means a silicon-containing group in which a hydrolyzable group or a hydroxyl group is bonded to the silicon atom and which is crosslinkable through silanol condensation reaction. While not limited thereto, typical reactive silicon groups are represented by Formula (3):

wherein $R^1$ and $R^2$ each represent an alkyl group having 1 to 20 carbon atoms, an aryl group having 6 to 20 carbon atoms, an aralkyl group having 7 to 20 carbon atoms or a triorganosiloxy group represented by $(R')_3SiO-$, wherein each of the three R' groups, which may be the same or different represents a monovalent hydrocarbon group having 1 to 20 carbon atoms; when there are two or more of each of the $R^1$ or $R^2$ groups, each of the $R^1$ and $R^2$ groups may be the same or different, and the $R^1$ can be the same or different from $R^2$; X is independently in each occurrence a hydroxyl group or a hydrolyzable group; a is independently in each occurrence 0, 1, 2 or 3; and b is independently in each occurrence 0, 1 or 2; and m represents 0 or an integer of from 1 to 19; wherein a and b are chosen to satisfy the relationship $a+\Sigma b\geq 1$.

The hydrolyzable group represented by X is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxy group, a mercapto group, and an alkenyloxy group. An alkoxy group is more preferred with a methoxy or ethoxy group being most preferred, for ease in handling due to its mild hydrolyzablility. One to three hydroxyl groups or hydrolyzable groups may be bonded to one silicon atom, and $(a+\Sigma b)$ is preferably 1 to 5. Where two or more hydroxyl groups or hydrolyzable groups are present per reactive silicon group, they may be the same or different. The reactive silicon group may have one or more silicon atoms. A reactive silicon group in which silicon atoms are linked to form siloxane bondings may have as much as 20 silicon atoms. From the standpoint of availability, reactive silicon groups represented by Formula (4) shown below are preferred:

wherein $R^1$, X, and a are as defined above. $R^1$ is preferably an alkyl group, e.g., methyl or ethyl; a cycloalkyl group, e.g., cyclohexyl; an aryl group, e.g., phenyl; an aralkyl group, e.g., benzyl; or a triogansiloxy group of formula $(R')_3SiO-$ in which R' is methyl or phenyl. R' and R' are most preferably a methyl group.

The oxyalkylene polymer contains at least one, and preferably about 1.1 to about 6 reactive silicon groups per molecule. If the number of the reactive silicon group per molecule is less than 1, the polymer has insufficient curability, failing to achieve satisfactory rubbery elasticity. The reactive silicon group may be placed either at the terminal or in the inside of the molecular chain of the oxyalkylene polymer. An oxyalkylene polymer having the reactive silicon group at the molecular terminal thereof tends to provide a rubbery cured product having high tensile strength and high elongation.

In one embodiment, the backbone can be a flexible polymer such as a polyether or polyolefin, having silicon moieties having bound thereto. A flexible polymer with unsaturation can be reacted with a compound having a hydrogen or hydroxyl moiety bound to silicon wherein the silicon moiety also has one or more carbon chains. The silicon compound can be added to the polymer at the point of unsaturation by a hydrosilylation reaction. This reaction is described in Kawakubo, U.S. Pat. No. 4,788,254, column 12, lines 38 to 61; U.S. Pat. No. 3,971,751; U.S. Pat. No. 5,223,597; U.S. Pat. No. 4,923,927; U.S. Pat. No. 5,409,995 and U.S. Pat. No. 5,567,833, incorporated herein by reference.

The prepolymer is present in the adhesive composition in a sufficient amount such that the adhesive is capable of bonding a window to another substrate, such as metal, plastic, a composite or fiberglass. Preferably, the substrates are coated and more preferably the substrates are coated with acid resistant paints, such as silane modified acrylic melamine coatings, melamine carbamate coatings, two part urethane coatings, or acid epoxy cure coatings. The adhesives of the invention are especially good for bonding windows to the silane modified acrylic melamine and the melamine carbamate paints. Preferably, the prepolymer is present in an amount of about 40 parts by weight or greater based on the weight of the adhesive, more preferably about 45 parts by weight or greater, and most preferably about 50 parts by weight or greater. Preferably, the prepolymer is present in an amount of about 80 parts by weight or less based on the weight of the adhesive, more preferably about 75 parts by weight or less, and most preferably about 70 parts by weight or less. As used herein unless otherwise specified, parts by weight refer to 100 parts by weight of the adhesive composition.

The adhesive composition may further comprise one or more catalysts which catalyze the silanol condensation reaction. Catalysts useful for the silanol condensation reaction are well-known in the art. Among preferred catalysts useful for silanol condensation are tin compounds such as, dialkyltin (IV) salts of organic carboxylic acids, such as dibutyltin diacetate, dimethyl tin dilaurate, dibutyltin dilaurate, dibutyltin maleate or dioctyltin diacetate; tin carboxylates, such as tin octylate or tin naphthenate; reaction products of dialkyltin oxides and phthalic acid esters or alkane diones; dialkyltin diacetyl acetonates, such as dibutyltin diacetylacetonate (also commonly referred to as dibutyltin acetylacetonate); dialkyltinoxides, such as dibutyltinoxide; tin(II) salts of organic carboxylic acids, such as tin(II) diacetate, tin(II) dioctanoate, tin(II) diethylhexanoate or tin(II) dilaurate; dialkyl tin (IV) dihalides, such as dimethyl tin dichloride; and stannous salts of carboxylic acids, such as stannous octoate, stannous oleate, stannous acetate, or stannous laurate. These silanol condensation catalysts may be used individually or in combinations of 2 or more. Preferred catalysts are the dialkyl tin dicarboxylates, dialkyl tin oxides, dialkyl bis(acetylacetonates), reaction products of dialkyltin oxide and phthalic acid esters or an alkane dione, dialkyltin halides and dialkyl tin oxides. Even more preferred catalysts are dibutyltin dilaurate, dimethyltin dilaurate, dibutyltin maleate, dibutyltin diacetate, tin octylate, tin naphthenate, reaction products of dibutyltin oxide and phthalic acid esters or pentanedione, dibutyl tin diacetylacetonate, dibutyltinoxide, dimethyl tin chloride and the like. The amount of catalyst used in the formulation is that amount which facilitates the cure of the adhesive without causing degradation of the adhesive after cure. The amount of catalyst in the adhesive formulation is preferably about 0.01 parts by weight or greater, more preferably about 0.1 parts by weight or greater, and most preferably about 0.2 parts by weight or greater, and preferably about 5 parts by weight or less, even more preferably about 1.0 parts by weight or less and most preferably about 0.4 parts by weight or less.

The adhesive composition further comprises a hydrocarbyl silane. The hydrocarbyl silane is added to enhance adhesion and the durability of the adhesion to window and coated surfaces, especially such surfaces that are unprimed. A hydrocarbyl silane is a compound having a silicon or siloxane backbone, hydrocarboxy groups and hydrocarbyl groups bound to the silicon atoms. Preferably, the silicon atoms or the hydrocarbon groups bonded to the silicon atoms do not have hydrophilic functional groups, such as hydroxyl, amino and thiol groups. The hydrocarbyl groups are preferably alkyl, alkaryl or alkenyl, more preferably alkyl or alkenyl. A preferred alkenyl group is a vinyl group. Preferred alkyl groups are lower alkyl, preferably $C_{1-4}$ alkyl, even more preferably methyl or ethyl and most preferably methyl. Preferably, one or more of the silicon atoms in the hydrocarbyl silane has at least one, and preferably one alkenyl group bonded thereto. More preferably, each silicon atom has an alkenyl group bonded thereto. Hydrocarboxy groups are preferably alkyloxy, alkenyloxy, cycloalkyloxy or aralkoxy groups. More preferred hydrocarbyloxy groups are alkoxy, with $C_{1-4}$ alkoxy being even more preferred, ethoxy and methoxy even more preferred and methoxy most preferred. Preferably, the hydrocarbyl silane corresponds to Formula 5

wherein $R^3$ is separately in each occurrence a hydrocarbyl and hydrocarbyloxy groups;

$R^4$ is separately in each occurrence a hydrocarbyl group; and x is separately in each occurrence an integer of about 1 to about 9.

Preferably, $R^3$ is separately in each occurrence an alkyl, alkaryl, alkenyl or alkoxy group; more preferably an alkyl or alkoxy group; even more preferably an alkoxy group and most preferably a lower alkoxy group. Preferred lower alkoxy groups are $C_{1-4}$ alkoxy, with ethoxy and methoxy more preferred and methoxy most preferred. Preferably, $R^4$ is separately in each occurrence an alkyl, alkaryl or alkenyl group; more preferably an alkenyl group; and most preferably a vinyl group. Preferably, x is separately in each occurrence an integer of about 1 to about 7; and most preferably an integer of about 1 to about 5. In a preferred embodiment the hydrocarbyl silane corresponds to Formula 6

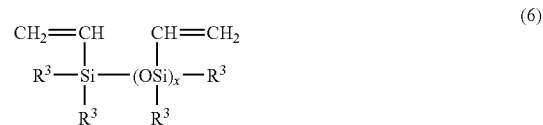

In a more preferred embodiment the hydrocarbyl silane corresponds to Formula 7

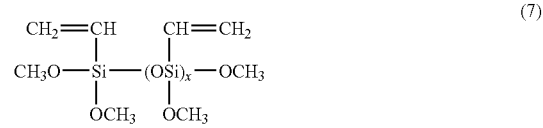

Preferred hydrocarbyl silanes comprise DYNASYLAN® 6490, DYNASYLAN® 6498, DYNASYLAN® 6598 silanes available from Degussa Corporation. The hydrocarbyl silane is present in a sufficient amount to enhance the adhesion to the coated substrate and the window surface. Preferably, adhesion to unprimed surfaces is enhanced. In a preferred embodiment, the adhesive composition of the invention is bonded to a ceramic frit or organic frit applied to the surface of the window, and more preferably the frit is unprimed. Preferably, the hydrocarbyl silane is present in the composition in an amount of about 0.1 parts by weight or greater, more preferably about 0.3 parts by weight or greater and more preferably about 0.4 parts by weight or greater. Preferably, the hydrocarbyl silane is present in the composition in an amount of about 2 parts by weight or less, more preferably about 1.5 parts by weight or less and more preferably about 1.2 parts by weight or less.

In a preferred embodiment, the adhesive includes a light stabilizer. Any light stabilizer which facilitates the system maintaining a durable bond to the substrate for a significant portion of the life of the structure to which it is bonded may be used. Preferred light stabilizers are hindered amine light stabilizers. Hindered amine light stabilizers generally include those available from Ciba Geigy such as TINUVIN™ 144, n-butyl-(3,5-di-ter-butyl-4-hydroxybenzyl)bis-(1,2,2,6-pentamethyl-4-piperidinyl) malonate; TINUVIN™ 622, dimethyl succinate polymer with 4-hydroxy-2,2,6,6-tetramethyl-1-piperidine ethanol; TINUVIN™ 77, bis(2,2,6,6-tetramethyl-4-piperidinyl) sebacate; TINUVIN™ 123, bis-(1-octyloxy-2,2,6,6, tetramethyl-4-piperidinyl) sebacate; TINUVIN™ 765, bis(1,2,2,6,6-pentamethyl-4-piperidinyl) sebacate; CHIMASSORB™ 944 poly[[6-[1,1,3,3-tetramethyl-butyl)amino]-1,3,5-triazine-2,4-diyl][(2,2,6,6-tetramethyl-4-piperidinyl)imino]-1,6-hexanediyl[(2,2,6-tetramethyl-4-piperidinyl)imino]]) available from Cytec; CYASORB™ UV-500, 1,5-dioxaspiro(5,5) undecane 3,3-dicarboxylic acid, bis(2,2,6,6-tetramethyl-4-piperidinyl)ester; CYASORB™ UV-3581, 3-dodecyl-1-(2,2,6,6-tetramethyl-4-piperidyl-pyrrolidin-2,5-dione) and CYASORB™ UV-3346, poly[(6-morpholino-s-triazine-2,4-diyl)[2,2,6,6-tetramethyl-4-piperidyl)imino]-hexamethylene [(2,2,6,6-tetramethyl-4-piperidyl)imino]]. More preferred hindered light amine stabilizers include TINUVIN™ 123 bis-(1-octyloxy-2,2,6,6, tetramethyl-4-piperidinyl)sebacate and TINUVIN™ 765 bis(1,2,2,6,6-pentamethyl-4-piperidinyl)sebacate. A sufficient amount of light stabilizer to enhance the bond durability to the substrate may be used. Preferably, the light stabilizer is used in an amount of about 0.1 parts by weight or greater based on the weight of the adhesive composition, more preferably about 0.2 parts by weight or greater and most preferably about 0.3 parts by weight or greater. Preferably, the amount of light stabilizer present is about 3 weight parts or less, based on the weight of the adhesive composition, more preferably about 2 weight parts or less and most preferably about 1.5 weight parts or less.

The adhesive compositions useful in this invention may further comprise stabilizers which function to protect the adhesive composition from moisture, thereby inhibiting advancement and preventing premature crosslinking of the polymer capable of crosslinking in the adhesive formulation. Included among such stabilizers are hydrocarbyl alkoxysilanes, such as vinyl trimethoxysilane, calcium oxide, p-toluenesulfonyl isocyanate (PTSI), diethylmalonate and alkylphenol alkylates. Such stabilizers are preferably used in an amount of about 0.1 part by weight or greater based on the total weight of the adhesive composition, preferably about 0.5 parts by weight or greater and more preferably about 0.8 parts by weight or greater. Such stabilizers are preferably used in an amount of about 5.0 parts by weight or less based on the weight of the adhesive composition, more preferably about 2.0 parts by weight or less and most preferably about 1.4 parts by weight or less.

The adhesive compositions used in the invention may further comprise an adhesion promoter known to those skilled in the art, such as those described in Mahdi et al., U.S. Pat. No. 6,828,403, column 11, line 50 to column 12, line 57 and Wu, U.S. Pat. No. 6,512,033 at column 5, line 38 to columns 6 and 7, line 35, both incorporated herein by reference. Preferable adhesion promoters are the amino alkoxy silanes, vinyl alkoxy slanes, isocyanato alkoxy silanes and isocyanurate functional alkoxy silanes. More preferred of the additional adhesion promoters include gamma-glycidoxypropyltrimethoxy silane, gamma-isocyanato-propyltrimethoxy silane, n-phenyl-gamma-aminopropyltrimethoxysilane, gamma-isocyanatopropylmethyldimthoxy silane, gamma-isocyanatopropyltriethoxy silane, beta (3,4-epoxycyclohexyl)ethyltriethoxysilane, gamma-glycidoxypropylmethyldimethoxy silane, tris-(gamma-trimethoxysilyl-propyl) isocyananurate, vinyltriethoxysilane, or vinyltrimethoxysilane. Such additional adhesion promoters are present in a sufficient amount to promote the adhesion of the adhesive to the glass or other substrate surface to the desired level usually determined by testing the lap shear strength and failure mode of the bond to the substrate. Preferably, the amount of adhesion promoter is about 10 parts by weight or less based on the weight of the adhesive; more preferably about 5 parts by weight or less and most preferably about 2 parts by weight or less. Preferably, the amount of adhesion promoter is about 0.01 parts by weight or greater based on the weight of the adhesive; more preferably about 0.1 parts by weight or greater and most preferably about 0.5 parts by weight or greater.

The adhesive compositions can also contain heat stabilizers known in the art. Among preferred heat stabilizers are alkyl substituted phenols, phosphites, sebacates and cinnamates. Preferably, the amount of heat stabilizer is about 5 parts by weight or less based on the weight of the adhesive; more preferably about 2 parts by weight or less and most preferably about 1.0 part by weight or less. Preferably, the amount of heat stabilizer is about 0.01 parts by weight or greater based on the weight of the adhesive; and most preferably about 0.3 parts by weight or greater.

In another preferred embodiment, the adhesive compositions used may further comprise an ultraviolet light absorber. Any ultraviolet absorber which enhances the durability of the bond of the adhesive to the substrate may be used. Preferred UV light absorbers include benzophenones and benzotriazoles. More preferred UV light absorbers include those from Ciba Geigy such as TINUVIN™ P, 2-(2'-hydroxy-5'-methylphenyl)-benzotriazole; TINUVIN™ 326, 2-(5-chloro-2H-benzotriazol-2-yl)-6-(1,1-dimethylethyl)-4-methylphenol; TINUVIN™ 213 poly(oxy-1,2-ethanediyl), (α,(3-(3-(2H-benzotriazol-2-yl)-5-(1,1-dimethylethyl)-4-hydroxyphenyl)-1-oxopropyl)-ω-hydroxy; poly(oxy-1,2-ethanediyl), (α,(3-(3-(AH-benzotriazol-2-yl)-5-(1,1-dimethylethyl)-4-hydroxyphenyl)-1-oxopropyl)-ω-(α,(3-(3-(2H-benzotriazol-2-yl)-5-(1,1-dimethylethyl)-4-hydroxyphenyl)-1-oxopropyl); TINUVIN™ 327, 2-(3,5-di-tert-butyl-2-hydroxyphenol)-5-chlorobenzotriazole; TINUVIN™ 571, 2-(2H-benzotriazol-2-yl)-6-dodecyl-4-methylphenol, branched and linear; TINUVIN™ 328, 2-(2H-benzotriazol-2-yl)-4,6-bis(1,1-dimethylpropyl)phenol and from Cytec such as CYASORB™ UV-9,2-hydroxy-4-methoxybenzophenone; CYASORB™ UV-24, 2,2'-dihydroxy-4-methoxybenzophenone; CYASORB™ UV-1164, -[4,6-bis (2,4-dimethylphenyl)-1,3,5-triazin-2-yl]-5-(octyloxy) phenol; CYASORB™ UV-2337, 2-(2'-hydroxy-3'-5'-di-t-amylphenyl)benzotriazole; CYASORB™ UV-2908, 3,5-di-t-butyl-4-hydroxybenzoic acid, hexadecyl ester; CYASORB™ UV-5337, 2-(2'-hydroxy-3',5'-di-t-butylphenyl)-5-chlorobenzotriazole; CYASORB™ UV-531, 2-hydroxy-4-n-octoxybenzophenone; and CYASORB™ UV-3638, 2,2-(1,4-phenylene)bis[4H-3,1-benzoxazin-4-one]. More preferred UV light absorbers include CYASORB™ UV-531, 2-hydroxy-4-n-octoxybenzophenone and TINUVIN™ 571 2-(2H-benzotriazol-2-yl)-6-dodecyl-4-methylphenol, branched and linear. Preferably, the UV light absorber is used in a sufficient amount to enhance the durability of the bond of the adhesive to the substrate. Preferably, the UV absorber is used in an amount of about 0.1 parts by weight or greater, based on the weight of the adhesive composition, more preferably about 0.2 weight parts or greater and most preferably about 0.3 parts by weight or greater. Preferably, the UV light inhibitor is used in an amount of about 3 parts by weight or less based on the weight of the adhesive composition, more preferably about 2 parts by weight or less and most preferably about 1 parts by weight or less.

The composition may further comprise a silicone-containing dehydrating compound. U.S. Pat. No. 4,977,228 discloses silicon-containing dehydrating compounds at column 10, line 27 to column 11, line 12, incorporated herein by reference. The silicon-containing dehydrating compound having three or four hydrolyzable groups bonded to the silicon atom is used to improve the storage stability of the curable polymer composition of the present invention, namely, to prevent increase of viscosity or gelation during storage. The hydrolyzable group bonded to the silicon atom of the silicon-containing compound may be the same as described above in connection with the silicon-containing reactive group. Preferably, the hydrolyzable group of the dehydrating compound is more reactive than that of the silicon-containing reactive group. When the number of the hydrolyzable groups bonded to the silicon atom of the silicon-containing compound is less than 3, the storage stability is not sufficiently improved, since the hydrolyzable groups of the silicon-containing dehydrating compound preferentially react with water in the composition, whereby the storage stability of the composition is improved.

Preferably, silicon-containing dehydrating compounds of Formula 8:

$$R^5_{4-n}SiX_n \qquad \text{Formula 8}$$

wherein $R^5$ is a substituted or unsubstituted monovalent hydrocarbon group, and X is a hydrolyzable group provided that when two or more X are present, they may be the same or different, and n is 3 or 4. $R^5$ is preferably a substituted or unsubstituted monovalent hydrocarbon group having 1 to 18 carbon atoms. Specific examples of $R^5$ are substituted or unsubstituted alkyl groups (e.g. methyl, ethyl, vinyl, methacryloxypropyl, etc.), substituted or unsubstituted aryl groups (e.g. phenyl, methylphenyl, etc.) and the like. As the hydrolyzable group X, an alkoxy group is preferred. Specific examples of the silicon-containing dehydrating compound are trimethoxysilane, triethoxysilane, methyl-dimethoxysilane, methyltrimethoxysilane, ethyl silicate, methyltriethoxysilane, n-propyltrimethoxysilane, methyldiisopropenyloxysilane, methyltriisopropenoxysilane, phenyldimethoxysilane, phenyltrimethoxysilane, phenyltriethoxysilane, vinyl-trimethoxysilane, vinyltriethoxysilane, γ-methacryl-oxypropyltrimethoxysilane, methyldiacetoxysilane, methyltriacetoxysilane, γ-amino-propyltrimethoxysilane, γ-aminopropyltriethoxysilane, γ-mercapto-propyltrimethoxysilane, γ-glycidoxy-propyltrimethoxysilane, bis(dimethylketoximate)-methylsilane, bis(cyclohexylketoximate)-methylsilane, etc. Among them, alkyltrimethoxysilanes and vinyltrimethoxy silane as preferred; with trimethoxyvinyl-silane and trimethoxymethylsilane more preferred since they are easily available and have better dehydration effects.

The amount of the silicon-containing dehydrating compound is selected such that the composition remains uncured before application to a substrate. The amount of the silicon-containing dehydrating compound is from about 0.01 to 10 parts by weight and more preferably from about 0.1 to 5 parts by weight per 100 parts by weight of the total amount of the adhesive composition. When the amount of the silicon-containing dehydrating compound is less than the above lower limit, the storage stability of the curable polymer composition is not sufficiently improved, while when said amount is larger than the above upper limit, the curing rate of the composition decreases.

The adhesive composition may contain other additives commonly used in adhesives formulations as known to those skilled in the art. The adhesive of the invention may be formulated with fillers known in the art for use in adhesive compositions. By the addition of such materials, physical properties such as viscosity, flow rates, sag and the like can be modified. However, to prevent premature hydrolysis of the moisture sensitive groups of the prepolymer, it is preferable to thoroughly dry the fillers before admixture therewith.

Optional components of the adhesive of the invention include reinforcing fillers. Such fillers are well-known to those skilled in the art and include carbon black, titanium dioxide, calcium carbonate, surface treated silica, titanium oxide, fumed silica, and talc. Preferred reinforcing fillers comprise carbon black. In one embodiment, more than one reinforcing filler may be used, of which one is carbon black, and a sufficient amount of carbon black is used to provide the desired black color to the adhesive. Preferably, the only reinforcing filler used is carbon black. The reinforcing fillers are used in a sufficient amount to increase the strength of the adhesive and to provide thixotropic properties to the adhesive. Preferably, the reinforcing filler is present in an amount of about 1 part by weight of the adhesive composition or greater, more preferably about 15 parts by weight or greater and most preferably about 20 parts by weight or greater. Preferably, the reinforcing filler is present in an amount of about 40 parts by weight of the adhesive composition or less, more preferably about 35 parts by weight or less and most preferably about 33 parts by weight or less.

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably, the clay is in the form of pulverized powder, spray dried beads or finely ground particles. Clays may be used in an amount of about 0 part by weight of the adhesive composition or greater, more preferably about 1 part by weight or greater and even more preferably about 6 parts by weight or greater. Preferably, the clays are used in an amount of about 20 parts by weight or less of the adhesive composition and more preferably about 15 parts by weight or less.

The adhesive composition of this invention may further comprise plasticizers so as to modify the rheological properties to a desired consistency. Such materials are preferably free of water, inert to reactive groups and compatible with the polymer used in the adhesive. Preferable plasticizers are well-known in the art and preferable plasticizers include alkyl phthalates, such as dialkyl phthalate, partially hydrogenated terpene, commercially available as "HB-40"; trioctyl phosphate; epoxy plasticizers; toluene-sulfamide; chloroparaffins; adipic acid esters; castor oil; toluene; xylene; n-methylpyrrolidinone; and alkyl naphthalenes. The preferred plasticizers are the phthalates. The more preferred plasticizers are the dialkyl phthalates. The amount of plasticizer in the adhesive composition is that amount which gives the desired rheological properties, which is sufficient to disperse the catalyst and other components in the system and to give the desired viscosity. The amounts disclosed herein include those amounts added during preparation of the prepolymer and during compounding of the adhesive. Preferably, plasticizers are used in the adhesive composition in an amount of about 0 part by weight or greater based on the weight of the adhesive composition, more preferably about 2 parts by weight or greater, even more preferably about 4 parts by weight or greater and most preferably about 6 parts by weight or greater. The plasticizer is preferably used in an amount of about 45 parts by weight or less based on the total amount of the adhesive composition, more preferably about 40 parts by weight or less, even more preferably about 30 parts by weight or less and most preferably about 25 parts by weight or less.

Optionally, the adhesive composition may further comprise a thixotrope. Such thixotropes are well-known to those skilled in the art and include alumina, limestone, talc, zinc oxides, sulfur oxides, calcium carbonate, perlite, slate flour, salt (NaCl), and cyclodextrin. The thixotrope may be added to the adhesive of the composition in a sufficient amount to give the desired rheological properties. Preferably, the thixotrope is present in an amount of about 0 part by weight or greater based on the weight of the adhesive composition, and preferably about 1 part by weight or greater. Preferably, the optional thixotrope is present in an amount of about 10 parts by weight or less based on the weight of the adhesive composition and more preferably about 2 parts by weight or less.

As used herein, all parts by weight relative to the components of the adhesive composition are based on 100 total parts by weight of the adhesive composition and all percentages by weight are based on the weight of the adhesive composition. The adhesive compositions of this invention may be formulated by blending the components together using means well-known in the art. Generally, the components are blended in a suitable mixer. Such blending is preferably conducted in an inert atmosphere and in the absence of atmospheric moisture to prevent premature reaction. It may be advantageous to add plasticizers to the reaction mixture for preparing the prepolymer so that such mixture may be easily mixed and handled. Alternatively, the plasticizers can be added during blending of all the components. Once the adhesive composition is formulated, it is packaged in a suitable container such that it is protected from atmospheric moisture. Contact with atmospheric moisture could result in premature cross-linking of the prepolymer.

The adhesive composition of the invention is used to bond porous and nonporous substrates together. The sealant composition is applied to the window surface or the other substrate, preferably the window surface, and is thereafter contacted with a second substrate. Thereafter, the adhesive is exposed to curing conditions. In a preferred embodiment, the other substrate is a plastic, metal, fiberglass or composite substrate which may optionally be coated. This method is especially effective for substrates coated with an acid resistant paint. In preferred embodiments, the surfaces to which the adhesive is applied are cleaned prior to application; see, for example, U.S. Pat. Nos. 4,525,511; 3,707,521 and 3,779, 794, incorporated herein by reference. The glass is prepared by cleaning the surface to which the adhesive composition is to be applied. A solvent wipe can be used to do this. Generally, a cloth or other device with an appropriate solvent applied thereto is used to clean the surface. Thereafter, a primer may be applied to the portion of the window to which the adhesive is to be applied. Glass primers and application methods for such primers are well-known in the art. Typically, the primer is applied with a brush or by a robot. A primer is not necessary where the adhesive is formulated so as to eliminate the need for one. In a preferred embodiment of the invention, the substrate is a building or an automobile. The adhesive is preferably deposited as a bead on the portion of the glass to be bonded into the substrate. The bead can be deposited by any known method to those skilled in the art. In one embodiment, the bead can be deposited using a caulk gun or similar type of manual application device. In another embodiment, the bead may be deposited by an extrusion apparatus such as a robotic extrusion apparatus. The adhesive is located on the portion of the window which will be contacted with the structure into which it will be bonded. In one preferred embodiment, the adhesive is placed about the periphery of one face of the window. Typically, the adhesive is in the form of a bead located about the periphery of the window. Preferably, the bead is a profiled shape along the cross-sectional plane. In the embodiment where the window designed for use in automobiles, the bead is applied to the portion of the glass to be contacted with the flange of the automobile window. The window can then be placed into the structure with the adhesive contacting both the window and the structure to which the window is to be bonded into. This contacting is performed by means well-known to those skilled in the art. In particular, the window can be placed in the structure by hand, by the use of a robot and the like. In a preferred embodiment, the window is glass or coated plastic with an abrasion resistant coating (coated plastic) applied thereto. Preferably, the window has a ceramic frit or organic frit deposited about the periphery of the window. Generally, the adhesives of the invention are applied at ambient temperature in the presence of atmospheric moisture. Exposure to atmospheric moisture is sufficient to result in curing of the adhesive. Curing may be further accelerated by applying heat to the curing sealant by any means known to one skilled in the art, for instance by convection heat or microwave heating. Preferably, the sealant of the invention is formulated to provide a working time of about 6 minutes or greater, more preferably about 10 minutes or greater. Preferably, the working time is about 20 minutes or less and more preferably about 15 minutes or less. Further, the adhesive of the invention demonstrates a lap shear according to the process described hereinafter after three days of curing at 23° C. and 50 percent relative humidity (RH) of about 360 psi (2.48 mPa) or greater and more preferably about 500 psi (3.45 mPa) or greater. Preferably, the adhesives of the invention demonstrate a tack free time of 40 minutes or less.

Molecular weights as described herein are determined according to the following procedure: determined using the Waters Model 590 Gel Permeation Chromatograph. This unit is connected to a multiwave length detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column. The quoted molecular weights are weight average molecular weights unless otherwise specified.

SPECIFIC EMBODIMENTS

The following examples are provided to more fully illustrate the invention, and are not intended to limit the scope of the claim. Unless otherwise stated, all parts and percentages are by weight.

The following are tests used for the prepared sealants.

Quick Knife Adhesion Test (OKA)

A 6.3 mm (width)×6.3 mm (height)×76.2 mm (length) size sealant bead is placed on 101.6 mm×101.6 mm piece of an acid resistant paint panel and the assembly is cured for a specific time in the condition of 23° C. and 50 percent relative humidity. The cured bead is then cut with a razor blade through to the painted surface at a 45 degree angle while pulling back the end of the bead at 180 degree angle. Notches are cut every 3 mm on the painted surface. The degree of adhesion is evaluated as adhesive failure (AF) and/or cohesive failure (CF). In case of adhesive failure, the cured bead can be separated from the painted surface, while in cohesive failure, separation occurs within the sealant bead as a result of cutting and pulling. The tested paint substrate can be used as supplied or treated by wiping with isopropanol (EPA) or naphtha (NP).

Weatherometer

The Weatherometer (WOM) was operated according to SAE J1895 conditions. The samples after exposure to the WOM were tested according to the Lap Shear tests described hereinafter.

Lap Shear Test

The glass coupon is 2.5 cm width by 7.5 cm length and has a 5 cm band of ceramic frit. The ceramic frit of the glass coupon was treated by wiping a cloth containing BETASEAL® 43518 primer available from the Dow Automotive business unit of The Dow Chemical Company, wiping off the BETASEAL® 43518 primer with a clean cloth and thereafter applying to the glass BETASEAL® 43520A primer available from the Dow Automotive business unit of The Dow Chemical Company. A sealant bead approximately 6.3 mm wide by 6.3 mm high is applied along the width of the glass and approximately 6 mm to 12 mm from the primed end. The painted metal coupon is immediately placed on the adhesive and the sample is allowed to cure at the condition of the 23° C. and 50 percent relative humidity for 7 days. The cured sample was then pulled at a rate of 1 inch/minute (2.5 cm/min) with an Instron Tester. Where the description indicates the sample is primerless to glass, the glass coupons were cleaned only with the isopropanel and no glass primer was applied.

Table 1—Ingredients

TABLE 1

| | |
|---|---|
| SAX ® 400[1] Prepolymer | Trifunctional polypropyleneoxide polyether with dimethoxymethyl silyl terminal groups having a molecular weight of about 20,000 |
| SILQUEST ® 9492[2] Adhesion Promoter | Bis-(3-trimethoxysilyl propyl) amine |

TABLE 1-continued

| | |
|---|---|
| DYNASYLAN 6490[3] | Methoxy functional vinyl siloxane oligomer |
| NEOSTAN U220[4] Catalyst | Dibutyl tin bisacetylacetonate |
| WESTON TNPP[5] | trinonylphenylphosphite |
| TINUVIN ™ 571[6] | 2-(2H-benzotriazol-2-yl)-6-dodecyl-4-methylphenol, branched and linear |
| TINUVIN ™ 765[6] | bis(1,2,2,6,6,-pentamethyl-4-piperidinyl) sebacate |

[1]Trademark of Kaneka Corporation.
[2]Trademark of OSI Specialties.
[3]Trademark of Degussa.
[4]Trademark of Nitto Kasei Co., Ltd.
[5]Trademark of Crompton.
[6]Trademark of Ciba Geigy.

EXAMPLES 1 TO 3

Moisture curable sealant compositions were prepared under anhydrous conditions by compounding silylated prepolymers with the components described in Table 2. The components, except carbon black, were charged to a one gallon planetary mixer and mixed for 15 minutes under vacuum at speed 3. The vacuum was broken with nitrogen and dried carbon black (cooled to room temperature) was added and wet out for 3 minutes at speed 2 with no vacuum. Then the mixture was mixed for 15 minutes under vacuum. At this point, the adhesive mixture was scraped down and then was mixed for an additional 10 minutes under vacuum. Finally, the adhesive was packaged into plastic tubes.

TABLE 2

| | | Example | | | | | |
|---|---|---|---|---|---|---|---|
| | | 1 | | 2 | | 3 | |
| | Component | Wt % | Wt (g) | Wt % | Wt (g) | Wt % | Wt (g) |
| 1 | SAX ™ 400(Silylated polymer) | 56.2 | 843.0 | 55.7 | 835.5 | 57.9 | 868.5 |
| 2 | Alkyl phthalate plasticizer | 12.8 | 192.0 | 11.59 | 173.8 | 9.39 | 140.8 |
| 3 | SILQUEST ™ 9492 | 0.5 | 7.5 | 1 | 15 | 1.0 | 15 |
| 4 | DYNASYLAN ™ 6490 | 0 | 0 | 0 | 0 | 0.6 | 9 |
| 5 | U-220 in 711P, 10% | 2.5 | 37.5 | 2.5 | 37.5 | 2.5 | 37.5 |
| 6 | WESTON ™ TNPP | 0 | 0 | 0.61 | 9.15 | 0.61 | 9.15 |
| 7 | TINUVIN ™ 571 | 0 | 0 | 0.8 | 12 | 0 | 0 |
| 8 | TINUVIN ™ 765 | 1.0 | 15 | 0.8 | 12 | 1.0 | 15 |
| 9 | Carbon black | 27 | 405 | 27 | 405 | 27 | 405 |
| | | 100.00% | 1500.0 | 100.00% | 1500.0 | 100.00% | 1500.0 |

Panel Preparation

Metal coupons (2.5 cm width by 10 cm length) were spray-coated the DuPont's GEN® IV basecoat and flashed. Then, the metal coupons were spray-coated again with DuPont's GEN® IV clear coat and flashed. They were baked in an oven for 29 minutes at 285° F. (141° C.).

Test Conditions

QKA and lapshear adhesion were tested after exposure to the following various conditions:

Condition 1: samples were cured for 7 days at 23° C. and 50 percent relative humidity.

Condition 2: samples were cured initially for 7 days at 23° C. and 50 percent relative humidity and then exposed to 38° C. and 100 percent relative humidity for 14 days.

Condition 3: samples were cured initially for 7 days at 23° C. and 50 percent relative humidity and then exposed to the weatherometer conditions of SAE J1885 for 2,000 hours.

Condition 4: samples were cured initially for 7 days at 23° C. and 50 percent relative humidity and then immersed in the 90° C. water bath for 9 days.

OKA of Adhesives 1 to 3

QKA samples of Adhesives 1 through 3 were prepared on the DuPont's GEN® IV coated panels. Similar samples were prepared on the isopropanol wiped glass coupons with sag bent bismuth-zinc frit. All of samples were quick knife tested according to the description before after the Conditions 1 and 2. The results are shown in Table 2. 100 percent cohesive failures were observed in each instance.

Lap Shear Adhesion Test of Adhesives 1 to 3

Lap shear samples of Adhesives 1 through 3 were prepared using DuPont's GEN®IV coated panels as the first substrate and the isopropanol wiped glass coupons with sag bent zinc frit as the second substrate. Similar lap shear samples of Adhesives 1 through 3 were prepared except using the isopropanol wiped glass coupons with sag bent bismuth-zinc frit as the second substrate. All of samples were tested with the Instron after exposure to Conditions 1 and 2. The results are shown in Table 2. 100 percent cohesive failures were observed in each case except Adhesives 1 and 2 had shown 35 percent and 20 percent adhesion failure to glass respectively on the zinc frit glass after Condition 2.

Table 3—QKA and Tests for Examples 1 to 3

TABLE 3

|  | Example | | |
| --- | --- | --- | --- |
|  | 1 | 2 | 3 |
| QKA (quick knife adhesion) Substrate: GEN ™ IV unprimed | | | |
| Condition 1 | 100% CF | 100% CF | 100% CF |
| Condition 2 | 100% CF | 100% CF | 100% CF |
| Bismuth-Zinc frit glass, IPA Wiped | | | |
| Condition 1 | 100% CF | 100% CF | 100% CF |
| Condition 2 | 100% CF | 100% CF | 100% CF |
| Lapshear Zinc frit glass and GEN ™ IV-ES, IPA Wipe on glass, Naptha wipe on panel | | | |
| Condition 1 | 571 psi/100% CF | 497 psi/99% CF | 525 psi/100% CF |
| Condition 2 | 289 psi/35% AF | 300 psi/20% AF | 515 psi/100% CF |
| Bismuth-Zinc frit glass and GEN ™ IV-ES, IPA Wipe on glass, Naphtha wipe on panel | | | |
| Condition 1 | 558 psi/100% CF | 563 psi/99 CF | 466 psi/100% CF |
| Condition 2 | 481 psi/100% CF | 511 psi/98% CF | 522 psi/100% CF |

Durability Test of Adhesives 1 to 3

Lap shear samples of Adhesives 1 through 3 were prepared on the DuPont's GEN®IV panels as the first substrate and the isopropanol wiped glass coupons with sag bent bismuth-zinc frit as the second substrate. Similar lap shear samples of Adhesives 1 through 3 were prepared except using the isopropanol wiped glass coupons with sag bent zinc frit as the second substrate. All of samples were tested with the Instron after exposure according to Condition 3. Results are shown in Table 4. 100 percent cohesive failures were observed in each case except Adhesives 1 and 2 had shown 50 percent and 10 percent adhesion failure to glass respectively on the bismuth-zinc frit glass after Condition 3.

Table 4 summarizes adhesion results of Lapshear testing on samples exposed to weatherometer conditions for Examples 1 to 3.

TABLE 4

|  | Example | | |
| --- | --- | --- | --- |
|  | 1 | 2 | 3 |
| Lapshear Bismuth-Zinc frit glass and GEN ™ IV, IPA Wipe on glass, Naphtha wipe on panel | | | |
| Condition 3 | 373 psi/50% AF | 349 psi/10% AF | 584 psi/100% CF |
| Zinc frit glass and GEN ™ IV, IPA Wipe on glass, Naphtha wipe on panel | | | |
| Condition 3 | 436 psi/100 CF | 636 psi/100 CF | 838 psi/100 CF |

Table 5 shows the QKA adhesion results for Examples 1 and 3 after exposure according to Condition 4. Example 3 has showed very good hot water stability.

TABLE 5

| QKA, Zinc frit glass, IPA Wiped 90° C. water | Example | |
| --- | --- | --- |
| immersion test: | 1 | 3 |
| Condition 4 | 30% AF/70% TF | 100% CF |

AF: Adhesion failure
TF: Thin film left on the substrate
CF: Cohesive failure

EXAMPLES 4 TO 5

Several formulations were prepared as described above. Different levels of hydrocarbyl silane were used and the formulations are listed in Table 6.

TABLE 6

| | | Example | | |
|---|---|---|---|---|
| | 4 | | 5 | |
| Component | Wt % | Wt (g) | Wt % | Wt (g) |
| 1 SAX ™ 400(Silylated polymer) | 57.9 | 868.5 | 57.9 | 868.5 |
| 2 PALATINOL ™ 711P | 9.69 | 145.35 | 9.09 | 136.35 |
| 3 SILQUEST ™ 9492 | 1 | 15 | 1.0 | 15 |
| 4 DYNASYLAN ™ 6490 | 0.300 | 4.50 | 0.9 | 13.50 |
| 5 U-220 ™ in 711P, 10% | 2.5 | 37.5 | 2.5 | 37.5 |
| 6 WESTON ™ TNPP | 0.61 | 9.15 | 0.61 | 9.15 |
| 7 TINUVIN ™ 571 | 0 | 0 | 0 | 0 |
| 8 TINUVIN ™ 765 | 1 | 15 | 1.0 | 15 |
| 9 CSX652A ™ | 27 | 405 | 27 | 405 |
| | 100.00% | 1500.0 | 100.00% | 1500.0 |

Lap shear samples of Examples 3 through 5 were prepared on the DuPont's GEN®IV panels as the first substrate and the isopropanol wiped glass coupons with sag bent zinc frit as the second substrate. All of samples were tested with the Instron after exposure according to Conditions 1 and 2. The results are shown in Table 7. 100 percent cohesive failures were observed in each case for Examples 3 and 5. Example 4 had shown 5 percent adhesion failure (5AF) to the glass frit and 7 percent adhesion failure (7AF) to the GEN®IV panel from Condition 1. Example 4 showed 10 percent adhesion failure to the glass frit from Condition 2.

TABLE 7

| Lapshear Zinc frit glass and GEN ™ IV, IPA Wipe on glass, Naphtha wipe on panel | Example | | |
|---|---|---|---|
| | 3 | 4 | 5 |
| Condition 1 | 544 psi/100 CF | 502 psi/5 AF-PU/Frit/7 AF-PU/Panel | 654 psi/100 CF |
| Condition 2 Humidity (100/100) | 584 psi/100 CF | 460 psi/10 AF | 573 psi/100 CF |

What is claimed is:

1. An adhesive composition comprising
one or more polymers having a flexible backbone and silane moieties capable of silanol condensation;
one or more hydrophobic silanes having one or more hydrocarbyloxy groups and one or more hydrocarbyl groups; and
one or more catalysts for the reaction of silane moieties with active hydrogen containing compounds
wherein the hydrophobic silanes correspond to the formula

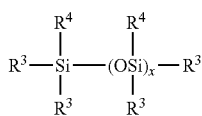

wherein
R$^3$ is separately in each occurrence a hydrocarbyl or hydrocarboxy group;
R$^4$ is separately in each occurrence a hydrocarbyl group; and
x is separately in each occurrence an integer of about 1 to about 9.

2. An adhesive composition according to claim 1 which further comprises one or more of a heat stabilizer or a light stabilizer.

3. An adhesive according to claim 2 wherein the groups bound on the silicon atoms comprise one or more of alkyl, alkenyl, cycloalkyl or alkaryl groups and one or more alkyloxy, alkenyloxy, cycloalkyloxy or alkaryloxy groups.

4. An adhesive according to claim 3 wherein at least one of the ligands bound to each silicone atom is alkenyl and the remainder is alkyl or alkoxy.

5. An adhesive according to claim 4 wherein the alkenyl group on each silane atom is a vinyl group, the alkyl group is methyl or ethyl and the alkoxy group is methoxy or ethoxy.

6. An adhesive composition according to claim 1 wherein
R$^3$ is separately in each occurrence an alkyl, alkaryl, alkenyl, alkenyloxy, cycloalkyloxy, aralkyloxy, or alkoxy group;
R$^4$ is separately in each occurrence an alkyl, alkaryl or alkenyl group;
x is separately in each occurrence an integer of about 1 to about 7.

7. An adhesive composition according to claim 1 wherein
R$^3$ is separately in each occurrence an alkyl or alkoxy group;
R$^4$ is separately in each occurrence an alkenyl group;
x is separately in each occurrence an integer of about 1 to about 5.

8. An adhesive composition according to claim 2 comprising:
A) from about 40 to about 80 parts by weight of one or more silane functional polymers;
B) from about 0.1 to about 1.2 parts by weight of one or more hydrocarbyl silanes
C) from about 0.01 to about 2.0 parts by weight of one or more catalysts; and
D) from about 0.01 to about 5 parts by weight of one or more light stabilizers and/or heat stabilizers.

9. An adhesive according to claim 8 wherein the silane functional polymer has a backbone of a polyolefin, polyurethane, polyester or polyether.

10. A method of bonding glass to a painted substrate which comprises
A) applying an adhesive according to claim 1 to either of glass or the unprimed painted substrate;
B) contacting the glass and the unprimed painted substrate such that the adhesive is disposed between the painted substrate and the glass; and
C) allowing the adhesive to cure to bond the glass to the painted substrate.

11. A method according to claim 10 wherein the painted substrate is the flange of an automobile adapted for holding a glass window into the automobile.

12. A method according to claim 11 wherein both the painted substrate and the glass surface is unprimed.

13. A method according to claim 12 wherein the glass surface to which the adhesive is applied has a ceramic or organic frit applied thereto.

14. A method according to claim 10 wherein the adhesive further comprises one or more of a heat stabilizer or a light stabilizer.

15. A method according to claim 14 wherein the groups bound on the silicon atoms of the hydrocarbyl silane comprise one or more of alkyl, alkenyl, cycloalkyl or alkaryl groups and one or more alkyloxy, alkenyloxy, cycloalkyloxy or alkaryloxy groups.

16. A method according to claim 15 wherein at least one of the ligands bound to each silicon atom is alkenyl and the remainder is alkyl or alkoxy.

17. A method according to claim 15 wherein the alkenyl group on each silicon atom is a vinyl group, the alkyl group is methyl or ethyl and the alkoxy group is methoxy or ethoxy.

18. A method according to claim 11 wherein the adhesive comprises
   D) from about 40 to about 80 parts by weight of one or more silane functional polymers;
   E) from about 0.1 to about 1.2 parts by weight of one or more hydrocarbyl silanes
   F) from about 0.01 to about 2.0 parts by weight of one or more catalysts; and
   D) from about 0.01 to about 5 parts by weight of one or more light stabilizers and heat stabilizers.

19. A method according to claim 10 wherein the silane functional polymer has a backbone of a polyolefin, polyurethane, polyester or polyether.

20. A window structure comprising a window bonded to a frame or a flange adapted to hold the window in place by means of an adhesive wherein the adhesive used to bond the window to the flange or frame corresponds to the adhesive of claim 1.

21. A method according to claim 10 wherein
   $R^3$ is separately in each occurrence an alkyl, alkaryl, alkenyl, alkenyloxy, cycloalkyloxy, aralkyloxy, or alkoxy group;
   $R^4$ is separately in each occurrence an alkyl, alkaryl or alkenyl group;
   x is separately in each occurrence an integer of about 1 to about 7.

22. A method according to claim 10 wherein
   $R^3$ is separately in each occurrence an alkyl or alkoxy group;
   $R^4$ is separately in each occurrence an alkenyl group;
   x is separately in each occurrence an integer of about 1 to about 5.

* * * * *